United States Patent [19]

Ito et al.

[11] Patent Number: 4,846,022
[45] Date of Patent: * Jul. 11, 1989

[54] VEHICULAR AUTOMATIC TRANSMISSION CONTROL SYSTEM WITH GEAR SHIFT INHIBITOR

[75] Inventors: Yasunobu Ito; Nobuaki Miki, both of Anjo, Japan

[73] Assignee: Aisin Warner Ltd., Japan

[*] Notice: The portion of the term of this patent subsequent to May 30, 2006 has been disclaimed.

[21] Appl. No.: 593,826

[22] Filed: Mar. 27, 1984

[30] Foreign Application Priority Data

Apr. 28, 1983 [JP] Japan ................................. 58-75916
Dec. 29, 1983 [JP] Japan ............................... 58-248075

[51] Int. Cl.⁴ ............................................ B60K 41/06
[52] U.S. Cl. ....................................... 74/866; 74/865;
74/869; 74/877; 74/878; 364/424.1
[58] Field of Search ................. 74/865, 866, 869, 877, 74/878; 364/424.1

[56] References Cited

U.S. PATENT DOCUMENTS

| | | | |
|---|---|---|---|
| 3,903,759 | 9/1975 | Hashimoto | 74/866 |
| 3,927,579 | 12/1975 | Golan | 74/869 |
| 3,943,799 | 3/1976 | Sakai et al. | 74/866 |
| 4,129,051 | 12/1978 | Shindo et al. | 74/867 |
| 4,143,563 | 3/1979 | Shindo et al. | 74/867 |
| 4,145,937 | 3/1979 | Shindo et al. | 74/867 |
| 4,148,232 | 4/1979 | Moriya | 74/865 |
| 4,186,627 | 2/1980 | Kuramochi | 74/869 |
| 4,346,626 | 8/1982 | Kawamoto | 74/866 |
| 4,346,627 | 8/1982 | Kawamoto et al. | 74/869 |
| 4,347,760 | 9/1982 | Jewett | 74/866 X |
| 4,406,181 | 9/1983 | Kubo et al. | 74/869 |
| 4,417,307 | 11/1983 | Kubo et al. | 364/424.1 |
| 4,467,427 | 8/1984 | Magnusson | 364/424.1 |
| 4,471,437 | 9/1984 | Yoshino et al. | 364/424.1 |
| 4,486,838 | 12/1984 | Itoh et al. | 364/424.1 |

FOREIGN PATENT DOCUMENTS

| | | | |
|---|---|---|---|
| 134169 | 11/1978 | Japan . | |
| 56-31550 | 3/1981 | Japan | 74/877 |
| 57-37143 | 3/1982 | Japan | 74/866 |
| 2080451 | 2/1982 | United Kingdom | 74/866 |

Primary Examiner—Kenneth J. Dorner
Assistant Examiner—Dwight G. Diehl
Attorney, Agent, or Firm—Lorusso & Loud

[57] ABSTRACT

A vehicular automatic transmission control system comprising: a hydraulic control circuit including a hydraulic pressure source, a pressure regulator valve for producing a line pressure by regulating the oil pressure supplied from the pressure source, a number of shift valves for selectively engaging and releasing friction members of the automatic transmission according to operating conditions of a vehicle such as vehicle speed and throttle opening rate, and a solenoid valve blocking switching operation of a highest shift gear toward a highest gear position of the transmission; and an electronic control circuit for controlling on- and off-ranges of the solenoid valve, including a manual mode switch for setting the control either in a highest speed non-cancel mode permitting shifts to the highest gear position or a highest speed cancel mode inhibiting shifts to the highest gear position and forcibly effecting a downshift when selected during operation in the highest gear position, and a vehicle speed sensor; characterized in that: the electronic control circuit is arranged to establish the highest gear position at a vehicle speed higher than a pre-determined value regardless of a signal from the manual switch.

3 Claims, 11 Drawing Sheets

VEHICULAR AUTOMATIC TRANSMISSION CONTROL SYSTEM WITH GEAR SHIFT INHIBITOR

BACKGROUND OF THE INVENTION

1. Field of the Invention

This invention relates to a control system for vehicular automatic transmissions, which is provided with a manual mode selector switch to prohibit operations in a highest gear position.

2. Description of the Prior Art

In a vehicular automatic transmission which is equipped with a fluid type torque converter and a transmission gear mechanism including a plural number of friction members for establishing a number of gear positions, the respective friction members are selectively engaged and released in various ways according to operating conditions of a vehicle to shift the transmission gear mechanism automatically into a speed position most suitable for the current operating condition of the vehicle. The operation of engaging and releasing these friction members is normally performed by a hydraulic control system incorporating a number of shift valves which are operated by opposing actions of a throttle pressure varying according to the extent of accelerator pedal depression or throttle opening rate and a governor pressure varying according to the vehicle speed, to select the gear position of the transmission gear mechanism on the basis of the contrastive relationship between the throttle and governor pressures, namely, between the extent of accelerator pedal depression and vehicle speed. Such a hydraulic control system for an automatic transmission is usually equipped with a manual shift valve thereby to switch the transmission manually to a desired speed range, setting a range over which the transmission is shiftable according to the above-mentioned opposing actions of the throttle and governor pressures, that is to say, setting the highest gear position to which the transmission is shiftable. The shift positions or selectable speed ranges of the automatic shift valves normally include forward drive ranges such as D-range, 2-range and L-range, and when the manual shift valve is in D-range position, the transmission gear mechanism is shiftable from a first speed position to a highest speed position of the transmission, normally to a third or fourth speed position.

For example, in the case of an automatic transmission with four forward speeds including "overdrive" as a fourth speed, the shift points of upshifts from third to fourth and downshifts from fourth to third are so determined as to permit shifts between the third and fourth speeds even in a throttle full open range for preventing overrunning of the engine and improving the performance quality at high speeds, for instance, at the time of the so-called 4–3 kickdown when gears are shifted from the fourth to the third speed position of a larger reduction ratio during operation in overdrive with a sharp increase in throttle opening rate due to a sudden depression of the accelerator pedal.

With a conventional hydraulic control system, the shift points between the third and fourth speeds are determined by the acting areas of throttle and governor pressures which are applied to a valve body of the 3–4 shift valve, a highest shift valve, and at the time of kickdown a detent pressure is applied to the valve body against the governor and throttle pressures. The governor pressure increases in proportion to the vehicle speed in low and middle speed ranges but it becomes dull in a high speed range due to oil leaks, so that at high speeds the shifts between the third and fourth speeds are effected by the throttle and detent pressures. Further, the hydraulic control system is provided with a solenoid valve for blocking a shift to the fourth speed of the highest gear position and forcibly effecting a downshift to the third speed during operation in the fourth speed, forcibly maintaining the third speed position in D-range operation when a manual mode selector switch which is provided beside the driver's seat is in a highest speed cancel position.

The conventional vehicular automatic transmission control system which permits to switch the operation to either the top speed non-cancel mode or the top speed cancel mode under any operating condition of a vehicle has a problem that overrunning of an engine is caused by a downshift when the O/D switch is inadvertently handled during operation at high speeds.

SUMMARY OF THE INVENTION

It is an object of the present invention to provide a vehicular automatic transmission control system which nullifies setting of a highest gear cancel mode by a manual mode switch, maintaining a highest gear position at a vehicle speed higher than a predetermined value for preventing degradations in mileage as well as overrunning of the engine as caused by mishandling of a manual mode selector switch.

It is another object of the present invention to provide a vehicular automatic transmission control system which is arranged to nullify signals from a manual mode switch to establish a highest gear position at a vehicle speed higher than a predetermined value.

According to one aspect of the present invention, there is provided a vehicular automatic transmission control system consisting of: a hydraulic control including a hydraulic pressure source, a pressure regulator valve for producing a line pressure by regulating the oil pressure supplied from the pressure source, a number of shift valves for selectively engaging and releasing friction members of the automatic transmission according to operating conditions of a vehicle such as vehicle speed and throttle opening rate, and a solenoid valve blocking switching operation of a highest shift valve to a highest gear position; and an electronic control for controlling on- and off-ranges of the solenoid valve, including a manual mode selector switch for setting the operation of the automatic transmission either in a highest gear non-cancel mode permitting shifts to the highest speed position or in a highest gear cancel mode preventing shifts to the highest speed position and forcibly effecting a downshift when in operation in the highest speed position, and a vehicle speed sensor; characterized in that the electronic control is arranged to establish the highest gear position at a vehicle speed higher than a predetermined value irrespective of a signal from the manual mode switch.

The above and other objects, features and advantages of the present invention will become apparent from the following description and appended claims, taken in conjunction with the accompanying drawings which show by way of example preferred embodiments of the invention.

DESCRIPTION OF PREFERRED EMBODIMENTS

Figure 1:
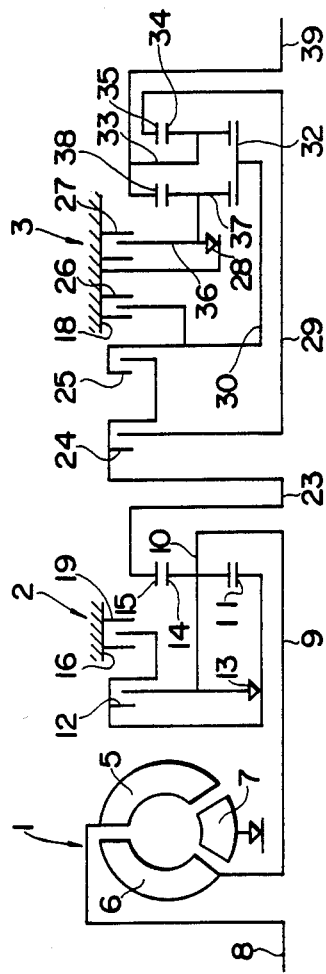
FIG. 1 is a skeletal view of an automatic transmission.

Referring to FIG. 1, there is shown in a skeletal view a vehicular automatic transmission consisting of a combination of a transmission gear mechanism with four forward speed positions including "overdrive" and one reverse position and a fluid joint (a torque converter in the particular embodiment shown). The automatic transmission is constituted by a torque converter 1, an overdrive gear mechanism 2 (hereinafter referred to simply as "overdrive mechanism"), and an underdrive gear mechanism 3 (hereinafter referred to simply as "underdrive mechanism") with three forward speed positions and one reverse position. The torque converter 1 includes, as well known in the art, a pump 5, a turbine 6 and a stator 7. The pump 5 and turbine 6 are coupled with an engine crank shaft 8 and a turbine shaft 9, respectively. The turbine shaft 9 which constitutes an output shaft of the torque converter 1 serves also as an input shaft of the overdrive mechanism 2, and is coupled with a carrier 10 of a planetary gear set of the overdrive mechanism 2. Planetary pinion 14 which is rotatably supported by the carrier 10 is meshed with a sun gear 11 and a ring gear 15. Provided between the sun gear 11 and carrier 10 are a multiple disc clutch 12 and a one-way clutch 13 which is located parallel with the multiple disc clutch 12. Further, a multiple disc brake 19 is provided between the sun gear 11 and an overdrive housing or case 16 which accommodates the overdrive mechanism.

The ring gear 15 of the overdrive mechanism 2 is coupled with an input shaft 23 of the underdrive mechanism 3. A multiple disc clutch 24 is provided between the input shaft 23 and an intermediate shaft 29, and a multiple disc clutch 25 is provided between the input shaft 23 and a sun gear shaft 30. A multiple disc brake 26 is provided between the sun gear shaft 30 and a transmission case 18. A sun gear 32 which is mounted on the sun gear shaft 30 constitutes two rows of planetary gear mechanisms along with a carrier 33, a planetary pinion 34 supported by the carrier 33, a ring gear 35 meshed with the pinion 34, another carrier 36, a planetary pinion supported by the carrier 36, and a ring gear 38 meshed with the pinion 37. The ring gear 35 in one planetary gear mechanism is coupled with the intermediate shaft 29. The carrier 33 in said one planetary gear mechanism is coupled with the ring gear 38 in the other planetary gear mechanism. The just-mentioned carrier and ring gear are coupled with an output shaft 39. A multiple disc brake 27 and a one-way clutch 28 are provided between the carrier 36 of said other planetary gear mechanism and the transmission case 18.

Figure 3:
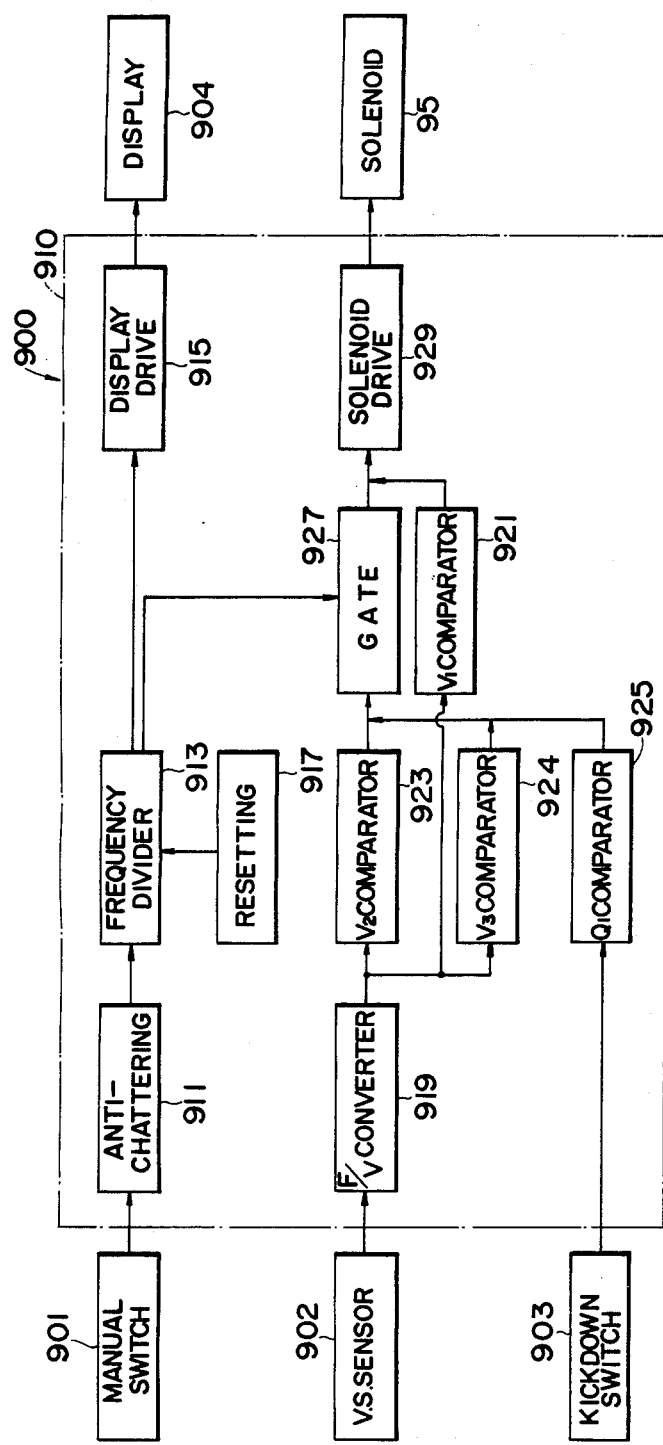
FIG. 3 is a block diagram of an electronic control circuit.

The automatic transmission is set in a position of the operational range as selected by a driver, under control of the hydraulic control system shown in FIG. 3, engaging and releasing the respective clutches and brakes selectively according to the extent of throttle opening of the engine and vehicle speed to effect shifts automatically to and from four forward speed positions including overdrive (O/D) or to a reverse position in response to a manual switching operation.

The operating conditions of the respective clutches and brakes are shown in Table 1 below, in relation with the shift or gear positions.

TABLE 1

| Reference Numeral | | | 12 | 24 | 25 | 19 | 26 | 27 | 13 | 28 |
|---|---|---|---|---|---|---|---|---|---|---|
| P | | | o | X | X | X | X | o | | |
| R | | | o | X | o | X | X | o | | |
| N | | | o | X | X | X | X | X | | |
| Forward | D-range | 1st | o | o | X | X | X | X | L | L |
| | | 2nd | o | o | X | X | o | X | L | 0 |
| | | 3rd | o | o | o | X | X | X | L | 0 |
| | | O/D | X | o | o | o | X | X | 0 | 0 |
| | 2-range | 1st | o | o | X | X | X | X | L | L |
| | | 2nd | o | o | X | X | o | X | L | 0 |
| | L-range | | o | o | X | X | X | o | L | L |

In Table 1, the letters "L" and "O" indicate "lock" and "overrun", respectively, and the marks "o" and "X" indicate engaged and released states of clutches or brakes, respectively.

Figure 2:
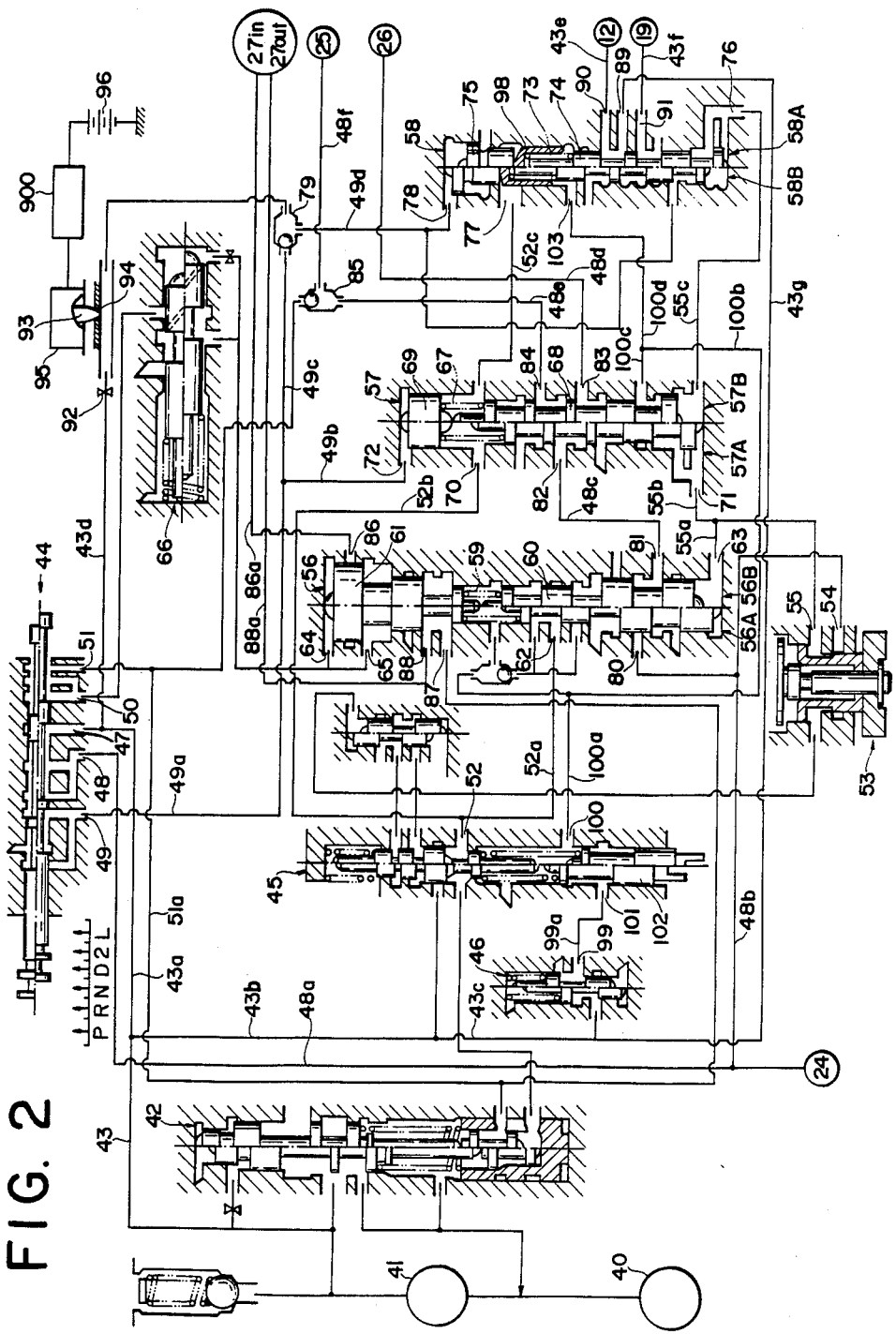
FIG. 2 is a diagrammatic illustration of a hydraulic control system embodying the present invention.

Referring to FIG. 2, there is shown a hydraulic control system for the automatic transmission of FIG. 1, which is provided with an oil pump 41, a pressure regulator valve 42, a manual shift valve 44, valves for producing controlled pressures including a throttle valve 45, a detent valve 46, a cutback valve 461 and governor valve 53, shift valves including 1-2 shift valve 56, 2-3 shift valve 57 and 3-4 shift valve 58 (an overdrive control valve), a low coast modulator valve 66 serving as a regulator valve, and a solenoid valve 95 for producing a controlled oil pressure for blocking shift operation of a highest shift valve to a highest speed position.

In this hydraulic control system, the oil which is drawn up by an oil pump 41 from an oil reservoir 40 is fed to a pressure regulator valve 42 which controls the line pressure to produce a regulated line pressure of a predetermined level in conduit 43. This line pressure is fed to a manual shift valve 44 through conduit 43a and also to a throttle valve 45 and a detent valve 46 through conduit 43b and 43c. In the manner well known in the art, the manual shift valve 44 is selectively switchable to one of the positions such as parking (P), reverse (R), neutral (N), D-range (D), 2-range (2), and L- or 1-range (L or 1), and the line pressure which is received at its input port 47 selectively appears at its output ports 48 to 51 according to the shift position of a spool valve. Table 2 below indicates the appearance of the line pressure at the output ports of the manual shift valve 44 in relation with the respective shift positions.

TABLE 2

| | Shift positions | | | | | |
|---|---|---|---|---|---|---|
| Conduits | P | R | N | D | 2 | L |
| 48 | | | | o | o | o |
| 49 | | | | | o | o |
| 50 | o | o | | | | o |

TABLE 2-continued

| Conduits | Shift positions | | | | | |
|---|---|---|---|---|---|---|
| | P | R | N | D | 2 | L |
| 51 | | o | | | | |

The throttle valve 45 produces at its output port 52 a throttle pressure varying according to the extent of accelerator pedal depression or throttle opening rate. The output port 48 of the manual shift valve 44 is communicated with the clutch 24 (a forward clutch) through conduit 48a and on the way it is also communicated with an input port 54 of a governor valve 53 through a branched conduit 48b. The governor valve 53 which receives the line pressure at its input port 54 produces a governor pressure commensurate with the vehicle speed.

The detent valve 46 regulates the supplied line pressure to produce a detent pressure in conduit 99a through its output port 99. The detent pressure which prevails in conduit 99a is supplied through conduits 100a, 100b, 100c and 100d to a 1-2 shift valve and an overdrive control valve serving as a 3-4 shift valve, depending upon the movement of a kickdown valve 102 of the throttle valve 45, namely, when the accelerator pedal is depressed to a large extent with the throttle valve in a full open range and the kickdown valve 102 is pushed upward in the drawing to communicate its input port 101 with its output port 100. When the throttle opening is outside the full open range, the kickdown valve 102 of the throttle valve 45 blocks the detent pressure input port 101 to stop the oil supply to the conduit 100a.

Denoted at 56 and 57 are a 1-2 shift valve and a 2-3 shift valve, respectively, and at 58 is an overdrive control valve (a 3-4 shift valve) mentioned above. The 1-2 shift valve 56 contains a couple of valve bodies 60 and 61 which are axially opposed to each other through a compression spring 59. The valve body 60 is displaceable to and from between a lower position indicated at 56A and an upper position indicated at 56B by the balancing action under the influence of the sum of downwardly acting forces of the spring 59 and the throttle pressure applied to port 62 through conduit 52a and an upwardly acting force of the governor pressure Pgo applied to port 63 at the lower end through conduit 55a. When the manual shift valve 44 is switched to the L-range position, the line pressure which appear at its output port 50 is supplied to ports 64 and 65 after pressure regulation through a low modulator valve 66, displacing the valve 61 downward in the drawing to hold the valve body 60 forcibly in the lower position 56A.

Similarly, the 2-3 shift valve 57 contains a couple of valve bodies 68 and 69 which are axially opposed to each other through a compression spring 67. The valve body 68 is likewise displaceable to and from a lower position indicated at 57A and an upper position 57B by its balancing action under the influence of the sum of downwarding acting forces of the spring 67 and the throttle pressure applied to port 70 through conduit 52b and an upwarding acting force of the governor pressure Pgo applied to port 71 through conduit 55b. When the manual shift valve 44 is switched to 2-range position, the line pressure which appears at its output port 49 is applied to the upper surface of the valve body 69 through conduits 49a and 49b and port 72, displacing the valve body 69 downward in the drawing to hold the valve body 68 forcibly in the lower position.

The 3-4 shift valve which serves as an overdrive control valve 58 in this particular embodiment is provided with a valve body 74 and a piston 75 which are axially opposed to each other through a compression coil spring 73 and a third coast valve 98, applying to the lower end of the valve body 74 the governor pressure Pgo which is supplied to port 76 through conduit 55c. Applied to the upper end of the valve body 74 is the throttle pressure Pth which is supplied to port 77 through conduit 52c. When the manual shift valve 44 is switched to the 2- or L-range position, port 78 is supplied with the line pressure which appears at the output port 49 through conduits 49a and 49c, shuttle valve 79 and conduit 49d or with an oil pressure at the level of the line pressure or at a level substantially lower than the line pressure through conduit 43d, shuttle valve 79 and conduit 49d in the manner as will be described hereinlater. When the oil pressure which is applied to port 78 is at a substantially lowered level as mentioned above, the piston 75 is pushed up into the upper position in the drawing by the action of the spring 73. In this state, the valve body 74 is displaced to the lower position 58A or upper position 58B by the balancing actions of the throttle pressure applied to the upper end of the valve body through port 77 and the governor pressure applied to the lower end through port 76.

When the detent pressure is supplied between the third coast valve 98 and valve body 74 through the detent pressure input port 103, the third coast valve 98 which receives the throttle pressure from above and the detent pressure from beneath in the drawing while the valve body 74 receives the detent pressure from above and the governor pressure from beneath. Accordingly, the valve body 74 is operated to switch the conduits by the balancing actions of the detent pressure and governor pressure. However, if the line pressure which is substantially higher than the throttle pressure is applied to port 78 as will be described hereinlater, the piston 75 is pushed downward in the drawing, forcibly maintaining the valve body 74 in the lower position 58A regardless of the governor pressure which acts on the lower end thereof.

When the manual shift valve 44 is switched to the D-range position, line pressure is supplied to port 48b of the 1-2 shift valve 56 through conduit 48b. This line pressure is led to port 82 of the 2-3 shift valve 57 through port 81 and conduit 48c when the 1-2 shift valve is in the upper position 56B. The line pressure which has been fed to port 82 is led to the brake 26 (a second brake) through port 83 and conduit 48d when the 2-3 shift valve 57 is in the lower position 57A. If the 2-3 shift valve 57 is in the upper position 57B, the line pressure which has been fed to port 82 is led to port 84 and then to the shuttle valve 85 through conduit 48a and further to the clutch 25 (a reverse clutch) through conduit 48f. When the manual shift valve 44 is switched to the L-range position, the line pressure which appears at the output port 50 is applied to ports 64 and 65 of the 1-2 shift valve 56 through the low modulator valve 66, and thereby pushing the valve body 61 downward, it is fed to the inner side of the brake 27 (a first reverse brake) through port 86 and conduit 86a to engage the brake 27. If the manual shift valve 44 is switched to the reverse position, the oil pressure which appears at output port 51 of the manual shift valve is fed to the outer side of the brake 27 through conduit 51a, ports 87 and 88 of the 1-2 shift valve and conduit 88a to engage the brake 27.

Port 89 of the overdrive control valve 58 is supplied with the line pressure through conduits 43b, 43c and 43g. The line pressure which has been fed to port 89 is supplied to the clutch 12 of the overdrive mechanism through port 90 and conduit 43e when the overdrive control valve is in the upper position 58A in the drawing, and to the brake 19 of the overdrive mechanism through port 91 and conduit 43f when the overdrive control valve is shifted to the upper position 58B.

Figure 4:
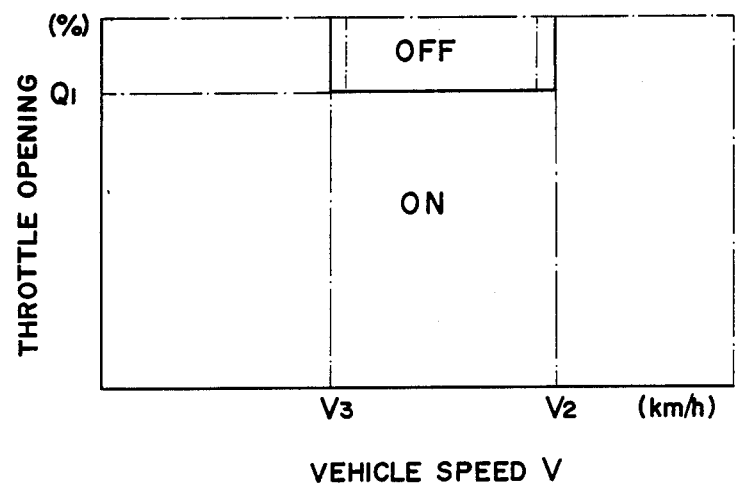
FIG. 4 is a graph showing on- and off-ranges of a solenoid operated by the electronic control circuit.

Conduit 43d is provided with a constriction 92 on the upstream side of a drain port 94 which is opened and closed by a valve body 93. This valve body 93 is operated by a solenoid 95. In this instance it is constantly urged in a direction of closing the drain port 94 by a spring which is not shown, and lifted up to uncover the drain port 94 only when the solenoid 95 is energized. The solenoid 95 is controlled by the electronic control system 900 as shown in FIG. 4 in which indicated at 96 is a power source, suitably a battery mounted on the vehicle.

The hydraulic control system of FIG. 3 operates in the following manner in the respective operational ranges.

[D-Range]

When the manual shift valve 44 is switched to the D-range position, the line pressure appears at port 48 alone and it is fed directly to the clutch 24. If the vehicle is at a halt or in a low speed coasting operation at this time, the governor pressure which is generated by the governor valve 53 is low so that generally the 1-2 shift valve 56, 2-3 shift valve 57 and overdrive control valve 58 are in the respective lower positions 56A, 57A and 58A, blocking at port 80 the oil pressure which is fed through conduit 48b. Accordingly, no oil pressure is supplied to the reverse clutch 25 and second brake 26 which are located downstream of port 80. Further, the oil pressure which is led to port 89 of the overdrive control valve 58 through conduit 43g at this time is fed to the clutch 12 of the overdrive mechanism. Therefore, in this position the overdrive mechanism is in locked state and the transmission gear mechanism is in the first speed.

In a general operating condition, if the vehicle speed is increased abruptly in this state, the governor pressure is elevated accordingly and the 1-2 shift valve 56 is shifted to the position 56B at a certain vehicle speed, whereupon the line pressure is led to port 81 and then from port 82 to 83 of the 2-3 shift valve 57 and supplied to the second brake 26 through conduit 48d. In this state, the transmission gear mechanism is switched to the second speed position.

On a further increase of the vehicle speed, the 2-3 shift valve 57 is also switched to the upper position 57B, and the oil pressure which is supplied to its port 82 is this time led to port 84 and as a result fed to the reverse clutch 25 through conduit 48e. In this state, the transmission gear mechanism is switched to the third speed position. If the vehicle speed is increased further, the overdrive control valve 58 is shifted to the upper position 58B to supply the oil pressure from port 89 to 91. In this state, the overdrive mechanism 2 is put in operation to achieve the overdrive condition.

Although in the foregoing description the valve switching operations are explained in relation with increases of governor pressure resulting from increases of vehicle speed, it is to be understood that the positions of valve elements of the respective shift valves are switched by the balancing actions of the opposing governor pressure and throttle pressure, and that the switching points are determined not only by the vehicle speed but also by the extent of accelerator pedal depression. On the contrary, if the vehicle speed is dropped, the overdrive control valve 58, 2-3 shift valve 57 and 1-2 shift valve 56 are switched to the lower positions 58A, 57A and 56A, respectively, in that order to change the gear position accordingly.

If the accelerator pedal is depressed quickly during operation, for example, in the second speed, the detent pressure which is produced in conduit 100a is supplied to the 1-2 shift valve 56 through conduit 100b and pushes the valve body 60 downward in the drawing to effect a kickdown to the first speed. If during operation in the third speed, the valve body 68 of the 2-3shift valve 57 is pushed downward in the drawing by the detent pressure which is fed thereto through conduit 100c to effect a kickdown to the second speed. In a case where the accelerator pedal is depressed until the throttle valve reaches a full open range during operation in overdrive, the detent pressure is led to input port 103 of the overdrive control valve 58 through conduit 100d to push up the third coast valve 98 from beneath, offsetting the throttle pressure which is applied to the third coast valve 98 from above and at the same time pushing down the valve body 74 from above. As a result, the valve body 74 is now primarily operated by the detent pressure and the governor pressure which is applied from beneath, that is to say, in the full open range of the throttle valve the shift point between the third and fourth speeds is determined solely by a variation of the governor pressure irrespective of the throttle pressure.

[2-Range]

If the manual shift valve 44 is switched to the 2-range position, the line pressure appears at port 49 in addition to port 48. The oil pressure which comes out at port 49 is fed to port 72 of the 2-3 shift valve 57 through conduits 49a and 49b and also to port 78 of the overdrive control valve 58 from conduit 49c and via shuttle valve 79 and conduit 49d, forcibly holding these valves in the lower positions 57A and 58B. Accordingly, in this state the overdrive mechanism is securely retained in locked state and the planetary gear mechanism is operated only in the second and lower speeds, namely, only in the first or second speed position.

[L-Range]

Upon switching the manual shift valve 44 to the L-range position, the oil pressure appears also at output port 50 and it is applied to ports 64 and 65 of the 1-2 shift valve 56 through the low modulator valve 66, forcibly holding the valve in the lower position 56A. In this state, the automatic transmission is maintained in the first speed position.

The electronic control system 900 includes a manual switch 901 for switching the operation either to an overdrive cancel mode which prohibits an upshift to the fourth speed position (O/D) and forcibly shifts down the gears to the third speed during operation in overdrive or to a top speed non-cancel mode which permits operation in the highest gear position (O/D), a vehicle speed sensor 902, a kickdown switch 903 for detecting a throttle opening rate greater than a predetermined value, a display for receiving and indicating the output signals of these sensor and switch, and an electronic control circuit 910 for controlling the solenoid 95.

The electronic control circuit 910 includes an anti-chattering circuit 911, a frequency divider 913, a display drive circuit 915, an automatic resetting circuit 917, F/V converter 919, V1 comparator 921, V2 comparator 923, V3 comparator 924, Q1 comparator 925, a gate circuit 927 and a solenoid drive circuit 929.

The electronic control circuit 910 includes an anti-chattering circuit 911, a frequency divider 913, a display drive circuit 915, an automatic resetting circuit 917, F/V converter 919, V1 comparator 921, V2 comparator 923, V3 comparator 924, Q1 comparator 925, a gate circuit 927, and a solenoid drive circuit 929.

Normally the electronic control circuit 910 is supplied with the output signals of kickdown switch 903, vehicle speed sensor 902 and manual selector switch 901, accordingly driving the display 904 and O/D solenoid 95, that is to say, holding the display 904 in on-state and the solenoid 95 in off-state in the O/D cancel mode. In the O/D non-cancel mode permitting operation in O/D, it operates in the manner as explained below.

The O/D selector switch 901 is constituted by a normally open momentary switch which is selectively manipulated by a driver to set the control either in O/D mode or O/D cancel mode. It produces the source voltage while depressed (ON), and remains open (OFF) when not depressed, sending a pulse signal to the anti-chattering circuit 911. Upon receipt of the output signal from the manual mode switch 901, the anti-chattering circuit 911 shapes its waveform to produce a chattering-free pulse to be fed to the gate circuit 912. On the rise of the pulse signal from the anti-chattering circuit 911, the frequency divider 913 inverts its output signals to be supplied to the display drive circuit 915 and the gate circuit 927. Namely, when its output signals which are fed to the display drive circuit 915 and the gate circuit 927 are at "high" and "low" levels, respectively, these signals are inverted to "low" and "high" levels respectively on the rise of the input pulse signal. The display drive circuit 915 turns on the display 904 when the output signal of the frequency divider 913 is at high level, and turns off the display when at low level. The automatic resetting circuit 917 supplies a momentary signal of high level when a power switch is turned on, thereby resetting the frequency divider 913 and initializing the levels of its output signals to be fed to the display drive circuit 911 and gate circuit 927, to low and high levels, respectively. The vehicle speed sensor 902 produces pulses at a frequency proportional to the vehicle speed, for supply to the F/V converter 919. The F/V converter 919 produces a voltage signal corresponding to the frequency of the pulse signal from the vehicle speed sensor 902, supplying the voltage signal to V1 comparator 921, V2 comparator 923 and V3 comparator 924. The V1 comparator 921 grounds its output signal to be fed to the solenoid drive circuit 929 if the voltage signal from F/V converter 919 is higher than a predetermined level V1 (e.g., a value corresponding to a vehicle speed higher than 160 km/h), and opens its output signal to solenoid drive circuit 929 if lower than V1. The V2 comparator 923 grounds its output signal to the gate circuit 927 when the voltage signal from the F/V converter 919 is greater than a predetermined level V2 (e.g., a value corresponding to a vehicle speed higher than 160 km/h), and opens its output signal to be fed to the gate circuit 927 when smaller than V2. V3 comparator 924 opens its output signal for the gate circuit 927 when the output signal of F/V converter 919 is greater than a predetermined voltage V3 (e.g., a voltage corresponding to a vehicle speed higher than 160 km/h), and grounds its output signal to be fed to the gate circuit 927 if smaller than V3. The kickdown switch 903 is a normally open switch which is turned on when the accelerator pedal is depressed by a driver to an angle exceeding a predetermined throttle opening rate Q1 (e.g., a value greater than 85%), grounding its output signal to Q1 comparator 925. If the accelerator pedal depression angle is smaller than Q1, the kickdown switch 903 opens its output signal to the Q1 comparator 925. The Q1 comparator 925 grounds its output signal to be fed to the gate circuit 927 when the output signal of the kickdown switch 903 is opened, and opens its output signal to the gate circuit 927 when the output signal of the kickdown switch 903 is grounded. The gate circuit 927 is put in gating action by the output signal of the frequency divider 913. The output signals of the V2 comparator 921, V3 comparator 923 and Q1 comparator 925 are passed as they are to the solenoid drive circuit 929 when the output signal of the frequency divider 913 is at high level. If the output signal of the frequency divider 913 is at low level, the signals to be fed to the solenoid drive circuit 929 are opened. The solenoid drive circuit 929 turns on the solenoid 95 when at least either one of the output signals of the gate circuit 927 and V3 comparator 924 is grounded, and turns off the solenoid 95 when both of the output signals of the gate circuit 927 and V3 comparator are opened.

Figure 5:
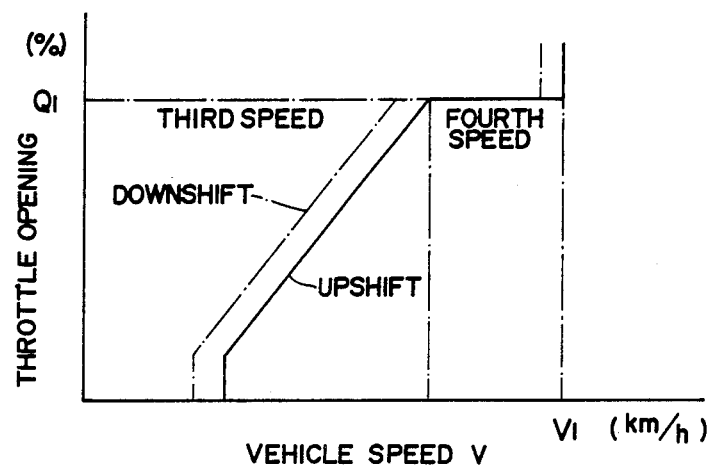
FIG. 5 is a graph showing shift lines between third and fourth speeds.
Figure 6:
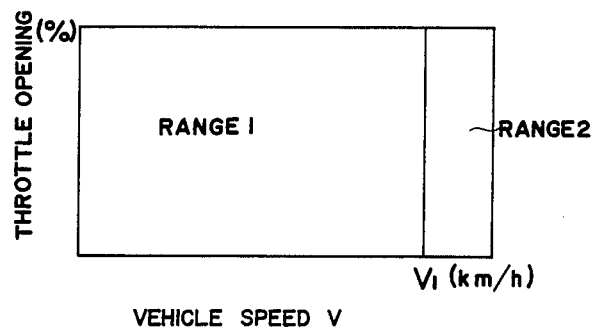
FIG. 6 is a graph showing the relationship between a preset vehicle speed and an O/D cancel feasible range.

In this manner, the solenoid 95 is turned on and off in the O/D non-cancel mode as shown in FIG. 4 according to the rate of throttle opening when the vehicle speed V is a predetermined range of $V3 = V = V2$, to effect shifts between the third and fourth speeds as shown in the shift diagram of FIG. 5. Shown in FIG. 6 are an O/D cancel feasible range 1 and an O/D cancel infeasible range 2, which are determined by the preset vehicle speed V1.

Figure 7:
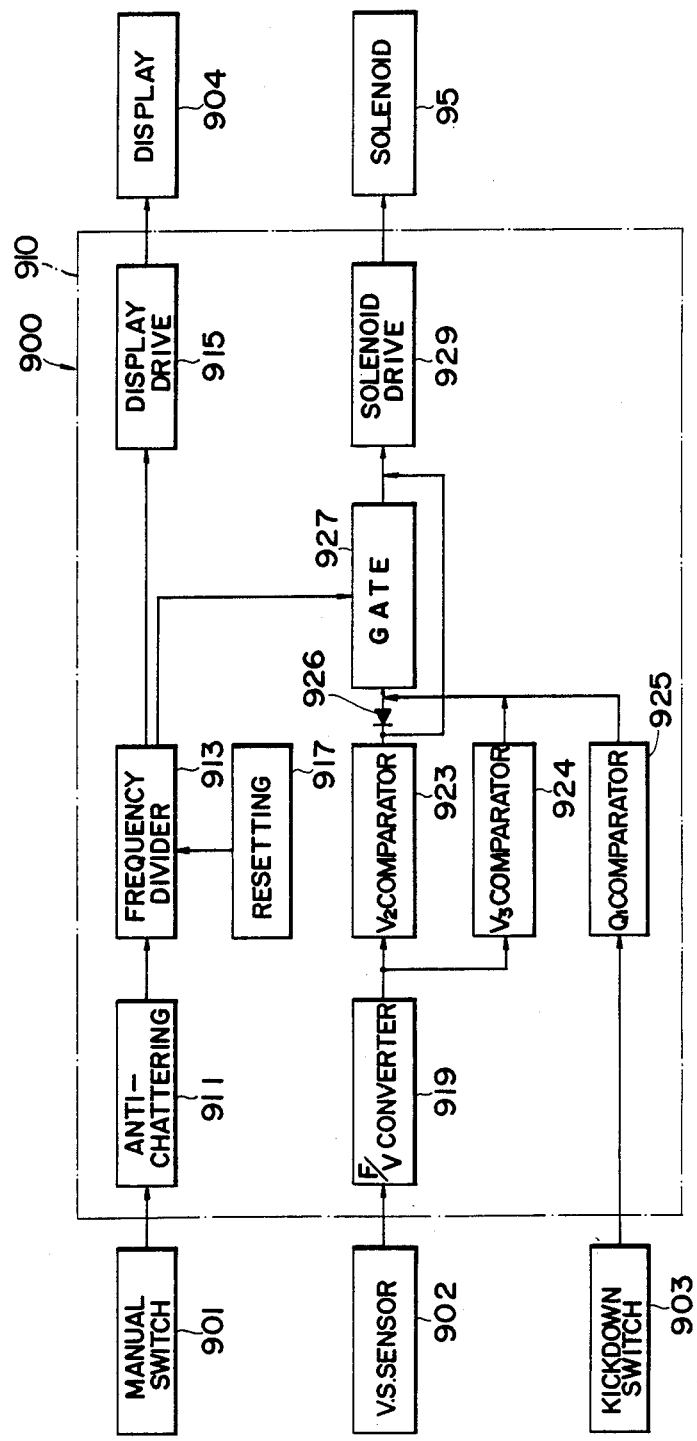
FIGS. 7 to 9 are block diagrams showing modifications of the electronic control circuit of FIG. 3.

FIG. 7 is a block diagram of a modified circuit arrangement for $V1 = V2$, in which a diode 926 is inserted between V1 comparator 921 and the gate circuit 927.

Figure 8:
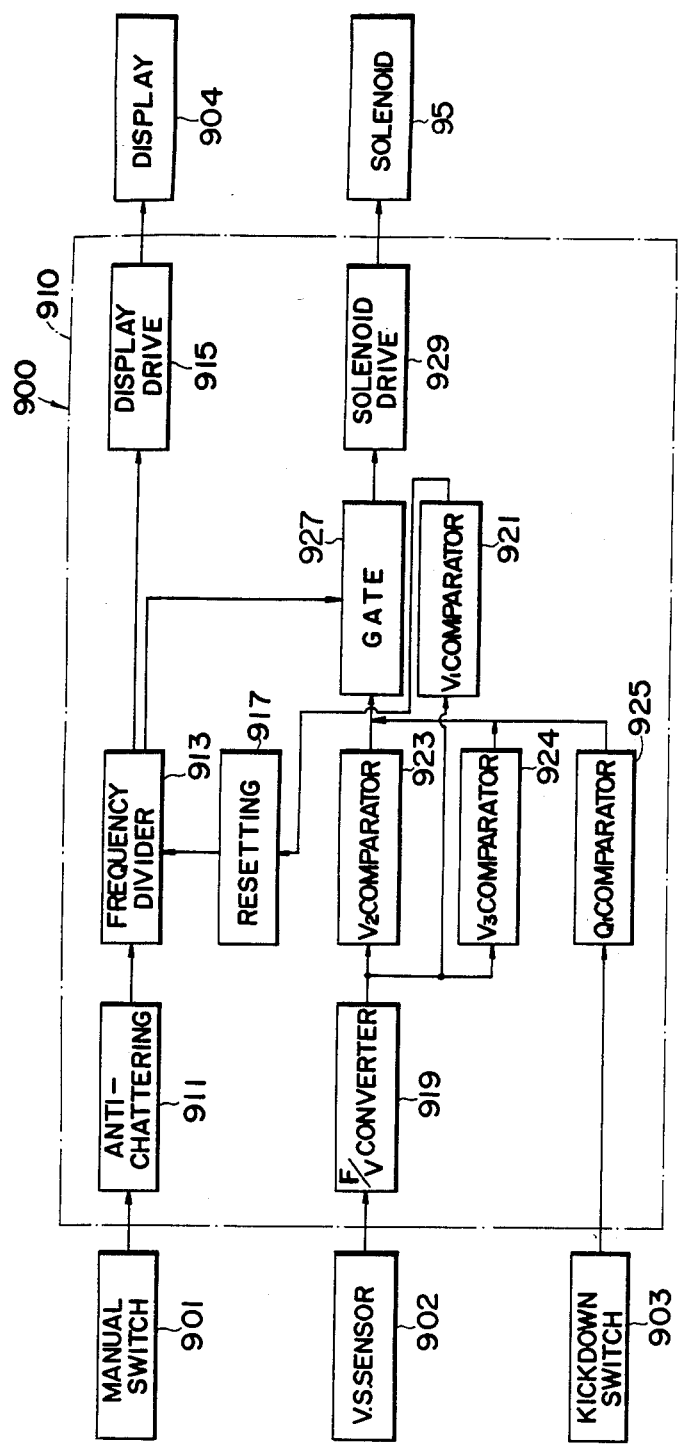
Figure 8:
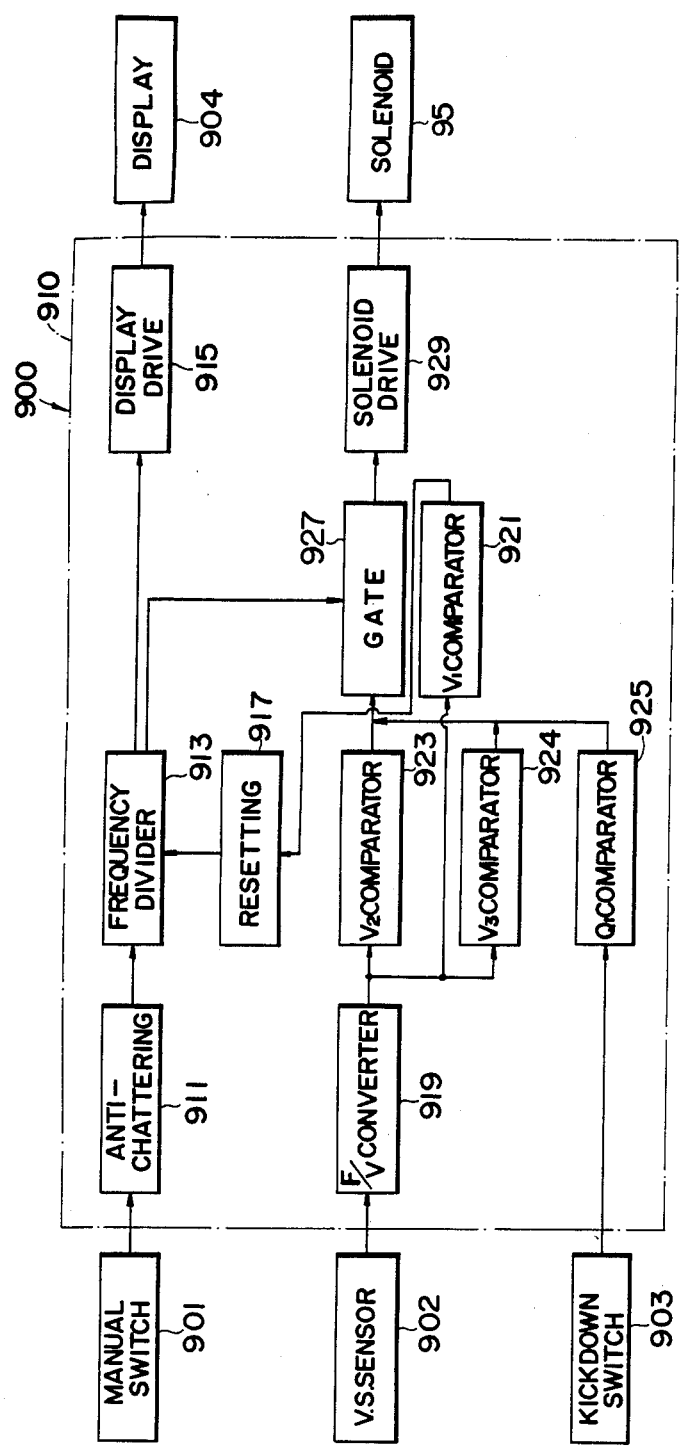

Referring to FIG. 8, there is shown another embodiment of the invention which is same as in FIG. 2 except that the output signal of V1 comparator 921 is fed to the automatic resetting circuit 917. In this case, when the output signal of F/V converter 919 exceeds a predetermined voltage V1 (e.g., a level corresponding to a vehicle speed of 160 km/h), V1 comparator 921 grounds its output signal to be fed to the automatic resetting circuit 917, opening the output signal to be fed to the automatic resetting circuit 917 if smaller than V1. As soon as a grounded signal is produced by V1 comparator 921, the automatic resetting circuit 917 initializes the control, nullifying the O/D cancel mode, so that the automatic transmission is operated in the O/D permitting mode until the manual switch 901 is actuated again by a driver at a vehicle speed lower than V1. The O/D mode is maintained even if the manual switch 901 is actuated by a driver at a vehicle speed in excess of V1 to prevent engine overrunning due to mishandling of the manual switch 901.

Figure 9:
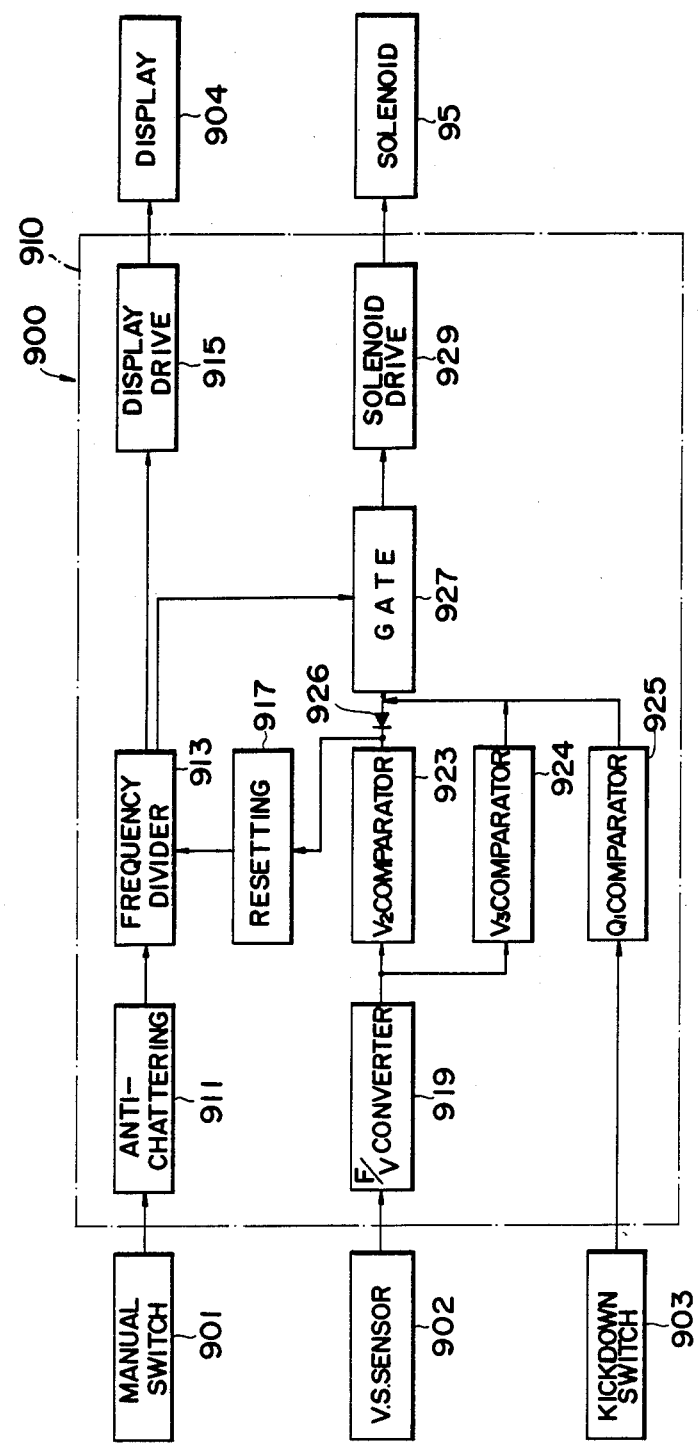

FIG. 9 illustrates a modification of the electronic control circuit of FIG. 8, which operates as $V1 = V2$ and has a diode inserted between V2 comparator 923 and gate circuit 927.

Figure 10:
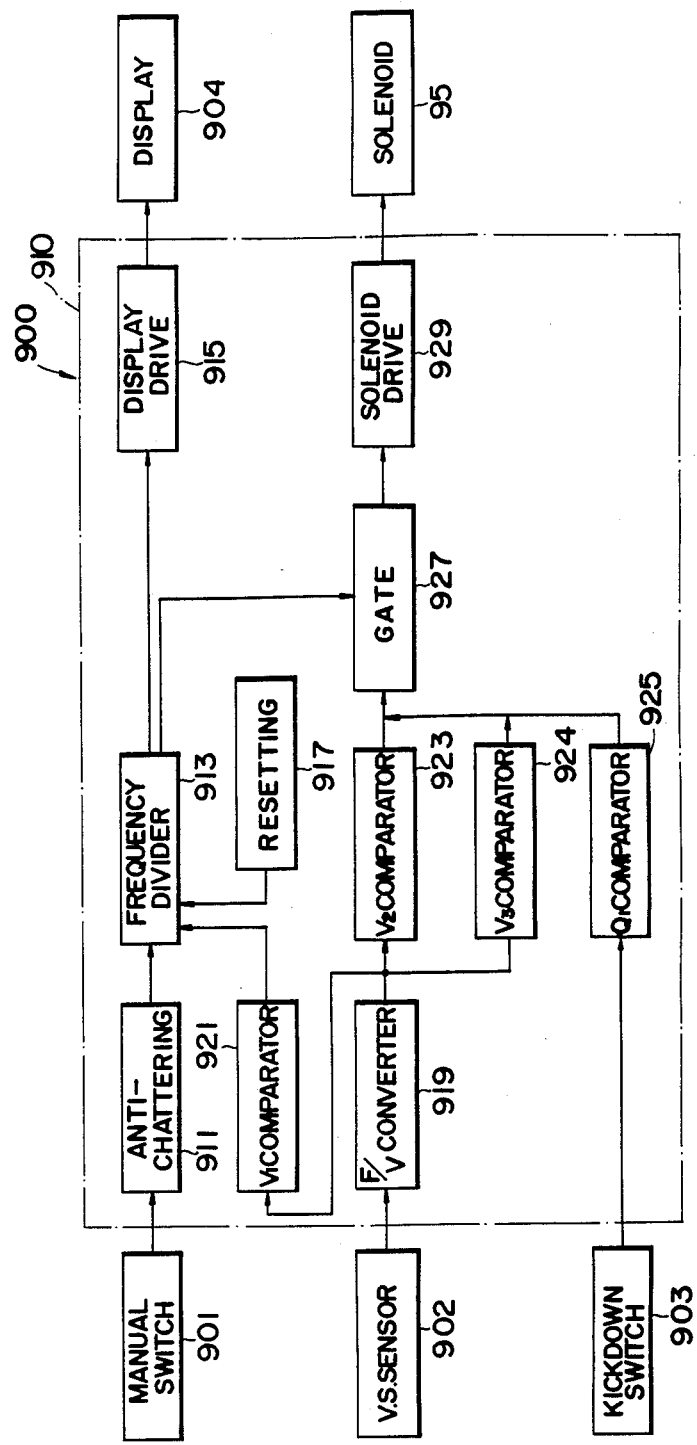
FIG. 10 is a block diagram of an electronic control circuit in another embodiment of the invention.

Referring now to FIG. 10, there is shown another electronic control circuit according to the present invention, which is arranged to inhibit switching of the operating mode at a vehicle speed higher than a predetermined value V1. In this case, the output of V1 comparator 921 is fed to the frequency divider 913 to lock its output signal when the voltage signal from the F/V converter 919 becomes higher than a predetermined level V1 (e.g., a level corresponding to a vehicle speed of 160 km/h). As a result of this channel lock, the frequency divider 913 retains the current output signal irrespective of the signal from the manual switch 901.

Figure 11:
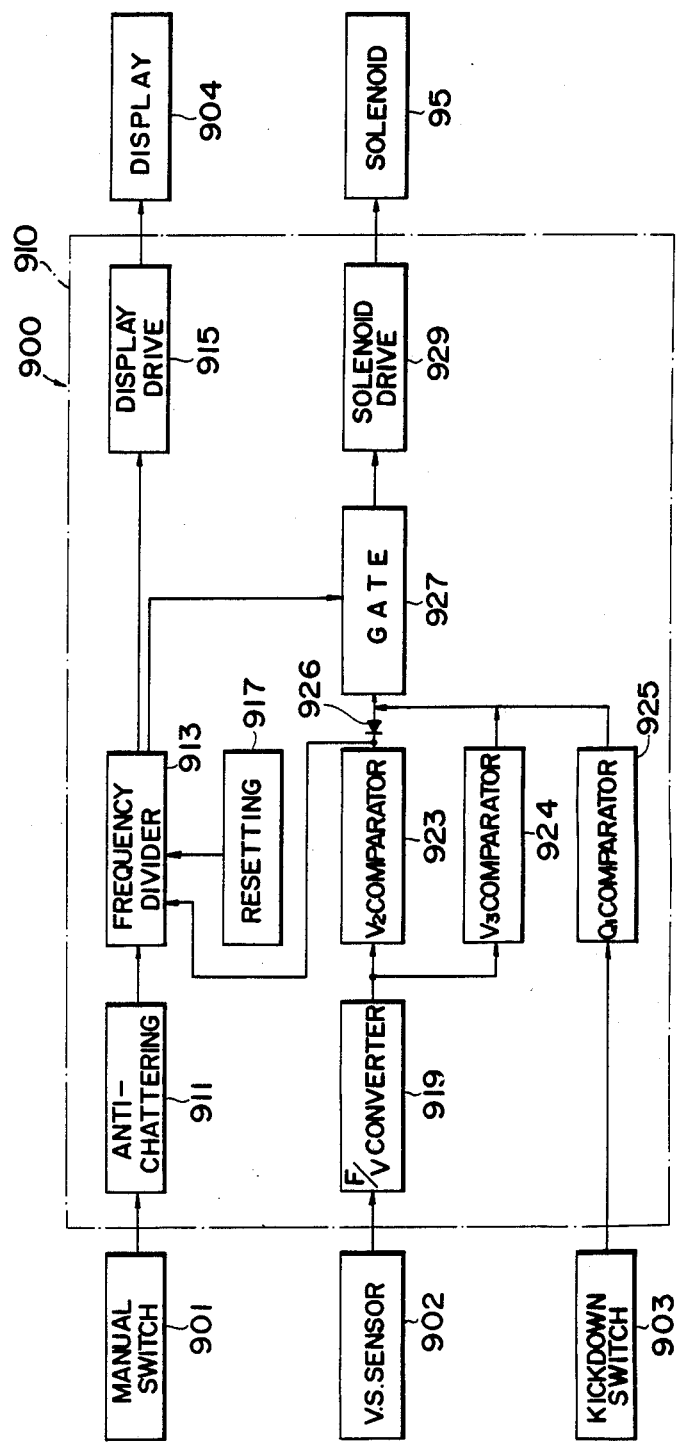
FIG. 11 is a block diagram showing a modification of the electronic control circuit of FIG. 10.

Shown in FIG. 11 shows a modified circuit arrangement for V1=V2, in which a diode 926 is inserted between V2 comparator 923 and gate circuit 927.

In the foregoing embodiments, once the power switch is turned off to stop the engine, the electronic control circuit 910 is invariably reset in the O/D noncancel mode upon turning on the power switch next time, by the signal from the automatic resetting circuit 917, maintaining that mode until the manual O/D cancel switch is turned on by a driver for operation in the O/D cancel mode.

As clear from the foregoing description, the vehicular automatic transmission control system according to the present invention comprises: a hydraulic control including a hydraulic pressure source, a pressure regulator valve for producing a line pressure by regulating the oil pressure supplied from the pressure source, a throttle valve for producing a throttle pressure corresponding to the throttle opening rate, a governor valve for producing a governor pressure commensurate with the vehicle speed, a manual shift valve for switching the gear position of a transmission gear mechanism, a plural number of shift valves operated by opposing actions of the throttle and governor pressures to switch the conduits of oil pressure to be supplied to hydraulic servos of the transmission gear mechanism, a detent valve for producing a detent pressure to be applied to the shift valves at the time of kickdown, and a solenoid valve adapted to produce an output for blocking a shift of a highest shift valve to a highest speed position, acting on the highest shift valve in a manner to offset the detent pressure and in opposing relation with the governor pressure; and an electronic control for controlling the solenoid valve, including a manual mode selector switch for switching the operation of the automatic transmission either to a highest gear non-cancel mode permitting a shift to the highest gear position or a highest gear cancel mode inhibiting a shift to the highest speed position and effecting a downshift forcibly when in operation in the highest speed position, a vehicle speed sensor, a kickdown switch for detecting accelerator pedal depression in excess of a predetermined throttle opening rate, and an electronic control circuit arranged to inhibit operation in the highest speed position when the throttle opening rate exceeds a predetermined value in a preset vehicle speed range during operation in the highest gear non-cancel mode and to nullify setting of the highest gear cancel mode by the manual mode selector switch at a vehicle speed higher than a predetermined value. Thus, whenever a vehicle is cruising at a high speed in excess of a preset value, it is possible to nullify inadvertent setting of the highest gear cancel mode to avoid deteriorations in mileage and overrunning of the engine.

What is claimed is:

1. A vehicular automatic transmission control system comprising:

a hydraulic control circuit including a hydraulic pressure source, a pressure regulator valve for producing a line pressure by regulating the oil pressure supplied from said pressure source, a number of shift valves for selectively engaging and releasing friction members of the automatic transmission according to operating conditions of a vehicle such as vehicle speed and throttle opening rate, and a solenoid valve blocking switching operation of a highest shift valve toward a highest gear position of the automatic transmission; and an electronic control circuit for controlling on- and off-ranges of said solenoid valve, including a manual mode switch for setting the operation of said transmission either in a highest gear non-cancel mode permitting shifts to the highest gear position or in a highest gear cancel mode inhibiting shifts to said highest gear position and forcibly effecting a downshift when selected during operation in the highest gear position, a frequency divider for inputting outputs of said manual mode switch and for controlling gating action of a gate circuit to a solenoid drive circuit, a vehicle speed sensor, and a comparator which determines whether or not the vehicle speed exceeds the predetermined value from outputs from said speed sensor, automatic resetting circuit connected to said frequency divider for initializing said frequency divider upon turning on a power switch of an engine, said comparator being arranged to nullify switching of the control mode selected by the manual mode switch at a vehicle speed higher than said predetermined value so that said highest gear position is established when the vehicle speed exceeds said predetermined value regardless of a signal from said manual made switch.

2. A vehicular automatic transmission control system as set forth in claim 1, wherein said comparator is connected between said vehicle speed sensor and said resetting circuit to initialize the mode of operation regardless of a signal from said manual switch at a vehicle speed higher than said predetermined value.

3. A vehicular automatic transmission control system comprising:

a hydraulic control circuit including hydraulic pressure source, a pressure regulator valve for producing a line pressure by regulating the oil pressure supplied from said pressure source, a number of shift valves for selectively engaging and releasing friction members of the automatic transmission according to operating conditions of a vehicle such as vehicle speed and throttle opening rate, and a solenoid valve blocking switching operation of a highest shift valve toward a highest gear position of the automatic transmission; and an electronic control circuit for controlling on- and off-ranges of said solenoid valve, including a manual mode switch for setting the operation of said transmission either in a highest gear non-cancel mode permitting shifts to the highest gear position or in a highest gear cancel mode inhibiting shifts to said higher gear position and forcibly effecting a downshift when selected during operation in the highest gear position, a frequency divider for inputting outputs of said manual mode switch and for controlling gating action of a gate circuit to a solenoid drive circuit, a vehicle speed sensor, and a comparator which determines whether or not the vehicle speed exceeds the predetermined value from outputs from said speed sensor, an automatic resetting circuit connected to said frequency divider for initializing the mode of operation upon turning on a power switch of an engine;

said comparator being connected between said vehicle speed sensor and said frequency divider, said comparator locking the output of said frequency divider and nullifying switching of the control mode selected by the manual mode switch to maintain a current mode of operation regardless of a signal from said manual mode switch at a vehicle speed higher than said predetermined value.

* * * * *

UNITED STATES PATENT AND TRADEMARK OFFICE
CERTIFICATE OF CORRECTION

PATENT NO. : 4,846,022
DATED : July 11, 1989
INVENTOR(S) : ITO et al

It is certified that error appears in the above-identified patent and that said Letters Patent is hereby corrected as shown below:

Col. 10, line 44, "FIG. 2" should be --FIG. 3--.

Col. 12, line 36, "made" should read --mode--.

Signed and Sealed this

Tenth Day of July, 1990

Attest:

HARRY F. MANBECK, JR.

Attesting Officer

Commissioner of Patents and Trademarks